United States Patent
Parsley et al.

(10) Patent No.: US 12,486,784 B2
(45) Date of Patent: *Dec. 2, 2025

(54) TURBINE OVERSPEED PROTECTION

(71) Applicant: ROLLS-ROYCE plc, London (GB)

(72) Inventors: Andrew Parsley, Bristol (GB); Natalie C Wong, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,743

(22) Filed: Apr. 3, 2024

(65) Prior Publication Data

US 2024/0369023 A1 Nov. 7, 2024

(30) Foreign Application Priority Data

May 3, 2023 (GB) ..................................... 2306518

(51) Int. Cl.
| F01D 21/04 | (2006.01) |
| F01D 21/00 | (2006.01) |
| F01D 21/14 | (2006.01) |

(52) U.S. Cl.
CPC ........... *F01D 21/04* (2013.01); *F01D 21/045* (2013.01); *F01D 21/006* (2013.01); *F01D 21/14* (2013.01); *F05D 2270/021* (2013.01); *F05D 2270/09* (2013.01); *F05D 2270/091* (2013.01)

(58) Field of Classification Search
CPC ........... F05D 2270/09; F05D 2270/091; F05D 2270/021; F01D 21/006
See application file for complete search history.

(56) References Cited

U.S. PATENT DOCUMENTS

| 4,539,809 | A | 9/1985 | Stanley et al. |
| 10,626,925 | B2 | 4/2020 | Boniface |
| 11,053,861 | B2 | 7/2021 | Moster et al. |
| 11,236,681 | B2 | 2/2022 | Beauchesne-Martel et al. |
| 11,629,613 | B2 | 4/2023 | Wong |
| 2006/0042226 | A1 | 3/2006 | Trumper et al. |
| 2017/0254295 | A1 | 9/2017 | Moster et al. |
| 2020/0200037 | A1 | 6/2020 | Brown et al. |
| 2020/0248581 | A1 | 8/2020 | Jones et al. |
| 2020/0248582 | A1 | 8/2020 | Wong |

(Continued)

FOREIGN PATENT DOCUMENTS

| GB | 2 574 495 A | 12/2019 |
| GB | 2 574 693 A | 12/2019 |

OTHER PUBLICATIONS

Aug. 20, 2024 Office Action issued in U.S. Appl. No. 18/625,842.

(Continued)

*Primary Examiner* — Lorne E Meade
*Assistant Examiner* — Alyson Joan Harrington
(74) *Attorney, Agent, or Firm* — Oliff PLC

(57) ABSTRACT

An apparatus and method for reducing a pressure differential across a turbine 19 of a gas turbine engine 10 during a shaft break event, comprises a pressure equalization apparatus 200, 300, 400, 500, 600, 700 configured to introduce a pressurised fluid into a core airflow A at a region directly downstream of the turbine 19 in the event of a shaft break to directly increase a local pressure at the downstream region 29 of the turbine 19 and thereby reduce the pressure differential across the turbine 19. The reduction in the pressure differential may result in a reduction in the acceleration of the turbine 19.

3 Claims, 16 Drawing Sheets

(56) References Cited

U.S. PATENT DOCUMENTS

2021/0095602 A1     4/2021    Calderon et al.
2023/0010174 A1     1/2023    McCarthy et al.

OTHER PUBLICATIONS

Oct. 10, 2023 Search Report issued in British Patent Application No. 2306518.8.
Oct. 16, 2023 Search Report issued in British Patent Application No. 2306521.2.
Oct. 10, 2023 Search Report issued in British Patent Application No. 2306519.6.
U.S. Appl. No. 18/625,769, filed Apr. 3, 2024 in the name of Parsley, A. et al.
U.S. Appl. No. 18/625,842, filed Apr. 3, 2024 in the name of Parsley, A. et al.
Nov. 18, 2024 extended Search Report issued in European Patent Application No. 24165901.0.
Jan. 13, 2025 Notice of Allowance issued in U.S. Appl. No. 18/625,842.
Apr. 23, 2025 Notice of Allowance issued in U.S. Appl. No. 18/625,769.

Figure 4 (previously known)

TURBINE OVERSPEED PROTECTION

This disclosure claims the benefit of UK Patent Application No. GB 2306518.8, filed on 3 May 2023, which is hereby incorporated herein in its entirety.

The present disclosure relates turbine overspeed protection in a gas turbine engine.

Modern gas turbine engines generally have up to three compressor-turbine pairs, also referred to as spools, connected by respective coaxial shafts. These compressor-turbine groups are responsible for the compression and expansion of core gas passing through the engine.

It is possible that during operation of the gas turbine engine, a shaft connecting a compressor-turbine pair may fail mechanically. This breakage leads to an instantaneous decoupling of the turbine and its respective compressor. In this situation, as the compressor is no longer being driven by the turbine, the load on the turbine is significantly reduced. It is therefore possible that the turbine may accelerate rapidly under the reduced load. The rapid acceleration has the potential to cause the turbine to disintegrate or burst leading to further damage to the engine as a result of the overspeed condition.

Some methods for protecting against turbine overspeed resulting from a shaft break event are known. For instance, GB2574495 describes a method which involves detecting a shaft break event and activating a mitigation system which introduces a fluid into a gas flow of the gas turbine engine downstream of the turbine or increases an amount of a fluid being provided into the gas flow of the gas turbine engine downstream of the turbine. This reduces an effective area of a nozzle for the gas flow to increase back pressure and therefore reduce the mass flow rate of the gas flow through the turbine.

Any such apparatus or methods for turbine overspeed protection must act extremely quickly after a shaft break event has occurred, or else risk not limiting the turbine speed in time.

The present disclosure provides a rapid and reliable apparatus and method for turbine overspeed protection in the event of a shaft break.

SUMMARY

According to a first aspect of the present disclosure, there is provided an apparatus for reducing a pressure differential across a turbine of a gas turbine engine during a shaft break event in which a shaft of the gas turbine engine breaks. The apparatus may comprise a pressure equalization apparatus configured to introduce a pressurised fluid into a core airflow at a region directly downstream of the turbine in the event of a shaft break to directly increase a local pressure at the downstream region of the turbine and thereby reduce the pressure differential across the turbine.

Core airflow should be understood to mean the path of gas primarily travelling through the compressor, combustor, and turbine of the gas turbine engine.

Directly downstream of the turbine should be understood to mean that the pressurised fluid is introduced proximate to the trailing edges of the turbine blades. For example, the pressurised fluid may be introduced directly at the trailing edges of the turbine blades, upstream of any directly subsequent stator, guide vanes, or exhaust duct downstream of the turbine, or axially in-line with any directly subsequent stator or guide vanes downstream of the turbine.

Directly increasing local pressure should be understood to mean that the pressurised fluid increases local pressure by virtue of its addition, and that no intermediate or additional action, such as combustion of the introduced fluid, is required to provide the local pressure increase.

The apparatus may comprise a pressurised fluid supply in communication with the core airflow at the downstream region and a regulating element configured to regulate the introduction of pressurised fluid from the supply into the core airflow at the downstream region. The regulating element may be configured to inhibit the flow of pressurised fluid from the supply into the core airflow at the downstream region before a shaft break event occurs and may be configured to permit the flow of pressurised fluid from the supply into the core airflow at the downstream region once a shaft break event occurs.

The pressurised fluid may be supplied from any suitable source including, but not limited to, compressor bleed air, combustor bleed air, bypass airflow etc. The pressurised fluid may be air or any other appropriate liquid or gas capable of providing an increase in pressure downstream of the turbine by virtue of its introduction.

The apparatus may comprise a control system and a sensor connected to the control system. The sensor may be configured to detect a shaft break event. The sensor may be configured transmit a signal to the control system once it detects a shaft break event. The control system may be configured to, on receiving the signal, actuate the regulating element to permit the flow of pressurised fluid into the core airflow at the downstream region. The regulating element may comprise a valve or pump.

The skilled person will be aware of various sensor configurations for detecting a shaft break.

A control system may take any form and may comprise a processor for interpreting signals sent by the sensor and executing instructions to actuate the regulating element. The instructions may be stored in a memory. The control system may also interface with or be a constituent part of another system such as an engine control system, fuel control unit etc. In some examples, the control system may be a mechanical, analogue, or non-digital control device.

The regulating element of the apparatus may comprise a retaining barrier configured to inhibit the flow of pressurised fluid from the supply into the core airflow at the downstream region. The regulating element may further comprise a piercing element operatively connected to or engageable by the turbine or a shaft and may be configured to puncture the retaining barrier during rearward movement of the turbine or the shaft in a shaft break event. This may permit flow of pressurised fluid into the core airflow.

The retaining barrier may be made from any material capable of withstanding the flow of pressurised fluid. In some examples, the retaining barrier may be made from metal. In all cases, it should be understood that the retaining barrier possesses characteristics, including material thickness, which allow it to be punctured by the piercing element. Likewise, the piercing element shall be configured to puncture the retaining barrier.

It should be appreciated that the piercing element may puncture the retaining barrier in a motion substantially perpendicular to the surface of the retaining barrier. However, the piercing element may also puncture the retaining barrier in a tearing, ripping, or splitting motion, or in any other way that enables the passage of the pressurised fluid through or past the retaining barrier.

The apparatus may comprise a passage formed between an upstream region of the turbine and the downstream region. The passage may provide fluid communication between the upstream region and the downstream region.

The apparatus may also comprise a blocking element configured to inhibit the flow of pressurised fluid from the upstream region to the downstream region via the passage. The blocking element may be configured to permit flow via the passage in a shaft break event.

The passage may comprise a hollow bore of a shaft end and the blocking element may comprise a wall of the shaft. During a shaft break event, the shaft end may separate from the shaft at a break point and an opening may be formed into the shaft end. Pressurised fluid from the upstream region may then be permitted to flow from the upstream region to the downstream region via the hollow bore of the shaft end.

The passage may comprise an annular flow path defined between a radially distal end of the turbine and a radially opposing wall of the core airflow. The blocking element may comprise a fuse configured to inhibit the flow of pressurised fluid from the upstream region to the downstream region via the passage. The fuse may be configured to trigger or blow during a shaft break event so as to permit the flow of pressurised air from the upstream region into the core airflow of the downstream region via the passage.

The fuse may be a component capable of undergoing deformation of its structure during a shaft break event so as to blow and permit fluid flow via the annular flow path. The fuse may comprise, for example a shear pin, a crumple zone, a sacrificial seal etc.

The fuse blowing should be understood to mean a sudden change in the structure and/or behaviour of the fuse over a short period of time in response to a predetermined force or signal.

The fuse may be configured to trigger or blow due to operative contact by the turbine or shaft during a rearward movement of the turbine during a shaft break event. The turbine or shaft may not directly contact the fuse and may instead apply a force to components linked to the fuse or cause an electrical signal to be sent to the fuse causing it to blow.

The apparatus may comprise a compressible fluid reservoir containing a volume of fluid disposed downstream of the turbine. The compressible fluid reservoir may be in communication with the downstream region. The volume of fluid may be configured to be compressed by a rearward movement of the turbine or the shaft during a shaft break event so as to eject at least a portion of the volume of fluid into the core airflow at the downstream region.

A rearward movement may mean a movement substantially parallel to a longitudinal axis of the gas turbine engine, in the direction from upstream of the turbine to downstream.

The compressible fluid reservoir may be formed by a fixed wall downstream of the turbine and a flange of the shaft.

According to a second aspect of the present disclosure, there is provided a gas turbine engine comprising an apparatus as described above. The pressure equalization apparatus of the present disclosure is applicable to both reheated and non-reheated gas turbine engines.

According to a third aspect of the present disclosure, there is provided a method for reducing a pressure differential across a turbine of a gas turbine engine during a shaft break event in which a shaft of the gas turbine engine breaks. The method may comprise providing a pressure equalization apparatus configured to introduce a pressurised fluid into a core airflow at a region directly downstream of the turbine in the event of a shaft break to directly increase a local pressure at the downstream region of the turbine and thereby reduce the pressure differential across the turbine.

The method may comprise providing a pressurised fluid supply in communication with the core airflow at the downstream region and providing a regulating element configured to regulate the introduction of pressurised fluid from the supply into the core airflow at the downstream region. The regulating element may be a valve or pump or may comprise a retaining barrier and piercing element.

The method may then go on to inhibit, using the regulating element, the flow of pressurised fluid from the supply into the core airflow at the downstream region before a shaft break event occurs; and permit, using the regulating element, the flow of pressurised fluid from the supply into the core airflow at the downstream region once a shaft break event occurs.

The method may comprise providing a passage formed between an upstream region of the turbine and the downstream region. The passage may provide fluid communication between the upstream region and the downstream region. The method may further comprise inhibiting, using a blocking element, the flow of pressurised fluid from the upstream region to the downstream region via the passage. The blocking element may be a section of the shaft or a fuse.

The method may then progress to the next step where the blocking element is modified to permit the flow of pressurised fluid via the passage from the upstream region into the core airflow at the downstream region once a shaft break event occurs.

The method may comprise providing a compressible fluid reservoir containing a volume of fluid disposed downstream of the turbine. The compressible fluid reservoir may be in communication with the downstream region. The method may further comprise compressing the volume of fluid by a rearward movement of the turbine or the shaft during a shaft break event and ejecting at least a portion of the volume of fluid into the core airflow at the downstream region.

The apparatus and methods disclosed may improve safety and reduce the likelihood of extensive damage during a shaft break event in a gas turbine engine. In vehicles comprising a gas turbine engine which are capable of high forward velocity, such as aircraft, the disclosed apparatus and methods may be particularly effective to reduce the likelihood of a turbine disc burst in a shaft break event.

The apparatus and methods disclosed may also reduce a time delay between when a shaft break event occurs and when a reduction in turbine rotational acceleration is achieved.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e., the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform. The radius of the fan may be measured between the engine centreline and the tip of a fan blade at its leading edge. The fan diameter (which may simply be twice the radius of the fan) may be greater than (or on the order of) any of: 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e., the values may form upper or lower bounds), for example in the range of from 210 cm to 240 cm, or 250 cm to 280 cm, or 320 cm to 380 cm.

The rotational speed of the fan may vary in use. Generally, the rotational speed is lower for fans with a higher diameter. Purely by way of non-limitative example, the rotational speed of the fan at cruise conditions may be less than 2600 rpm, for example less than 2500 rpm, or less than 2300 rpm. Purely by way of further non-limitative example, the rotational speed of the fan at cruise conditions for an engine having a fan diameter in the range of from 210 cm to 300 cm (for example 240 cm to 280 cm or 250 cm to 270 cm) may be in the range of from 1700 rpm to 2600 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e., the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e., the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 155 kN to 170 kN, 330 kN to 420 kN, or 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1520K, 1530K, 1540K, 1550K, 1600K or 1650K. The TET at cruise may be in an inclusive range bounded by any two of the values in the previous sentence (i.e., the values may form upper or lower bounds), for example 1530K to 1600K. The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e., the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint-in terms of time and/or distance-between top of climb and start of descent). Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft-steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000m, for example in the range of from 10000 m to 12000m, for example in the range of from 10400 m to 11600m (around 38000 ft), for example in the range of from 10500 m to 11500m, for example in the range of from 10600 m to 11400m, for example in the range of from 10700m (around 35000 ft) to 11300m, for example in the range of from 10800 m to 11200m, for example in the range of from 10900 m to 11100m, for example on the order of 11000m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Arrangements will now be described by way of example only, with reference to the Figures, in which:

FIGS. 6A and 7A show the two arrangements before they are activated as a result of a shaft break event. FIGS. 6B and 7B show the two arrangements after they have been activated as a result of a shaft break event;

FIG. 9A shows the state before a shaft break event and FIG. 9B shows the state after a shaft break event;

DETAILED DESCRIPTION

Figure 1:
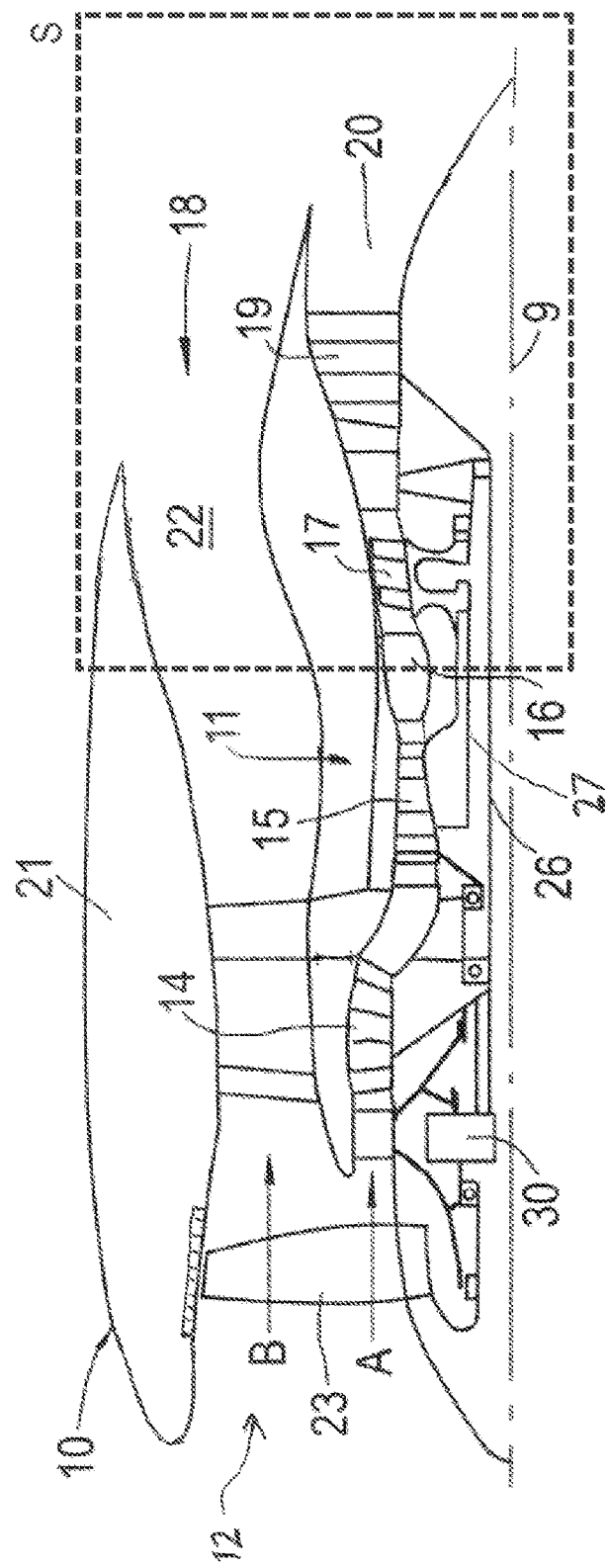
FIG. 1 is a sectional side view of a gas turbine engine.

FIG. 1 illustrates a gas turbine engine 10 having a principal rotational axis 9 (also referred to as the axis 9). The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

A section labelled S is also shown on FIG. 1. This section shows the area where a turbine 19 overspeed protection apparatus of the present disclosure would be disposed.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
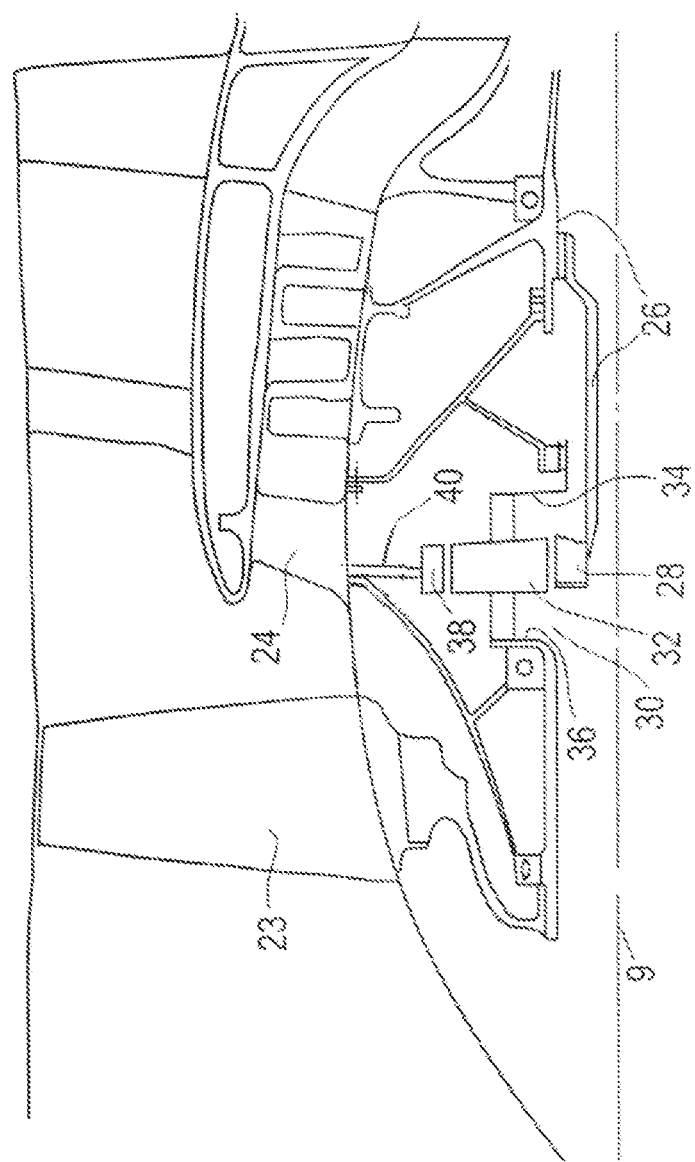
FIG. 2 is a close-up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
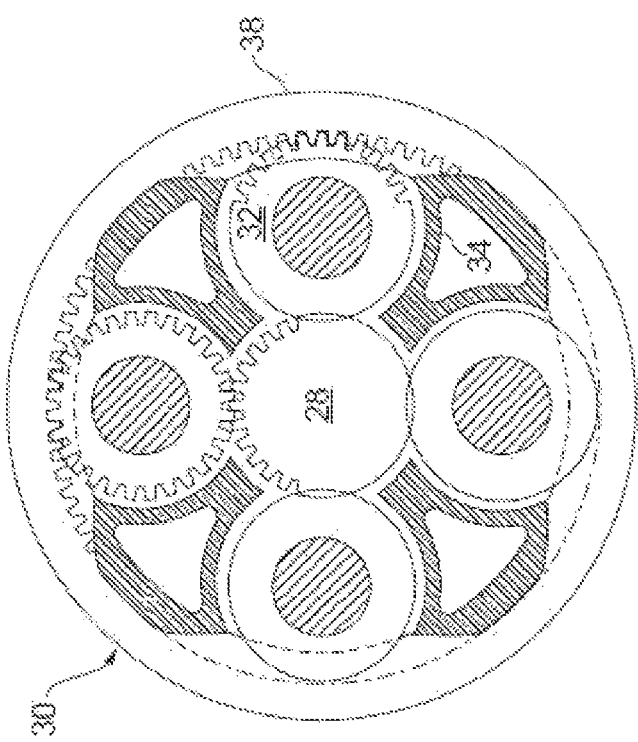
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

During a shaft break event, a shaft connecting a turbine to a compressor in a gas turbine engine 10 undergoes a sudden failure. This results in the turbine no longer being constrained in its rotation or in the longitudinal axis. Further, as the load provided by the compressor is no longer acting on the turbine, it is possible for the fluid continuing to pass through the turbine to cause the turbine to accelerate in rotational speed. Turbines are generally rated to a maximum operating rotational speed based, at least partly, on material and geometry. Beyond this speed the turbine may become unsafe. When a shaft break event occurs, there is a possibility of an overspeed condition where the free spinning turbine exceeds this maximum rated speed possibly causing the turbine to disintegrate or burst.

FIGS. 4-10 of the present disclosure are all sectional views of a gas turbine engine 10. The approximate section shown in each is highlighted in FIG. 1 as box S. In these FIGS. 4-10, a shaft break event is shown as a separation of the shaft 26 from the shaft end 33 at break point 31.

Figure 4:
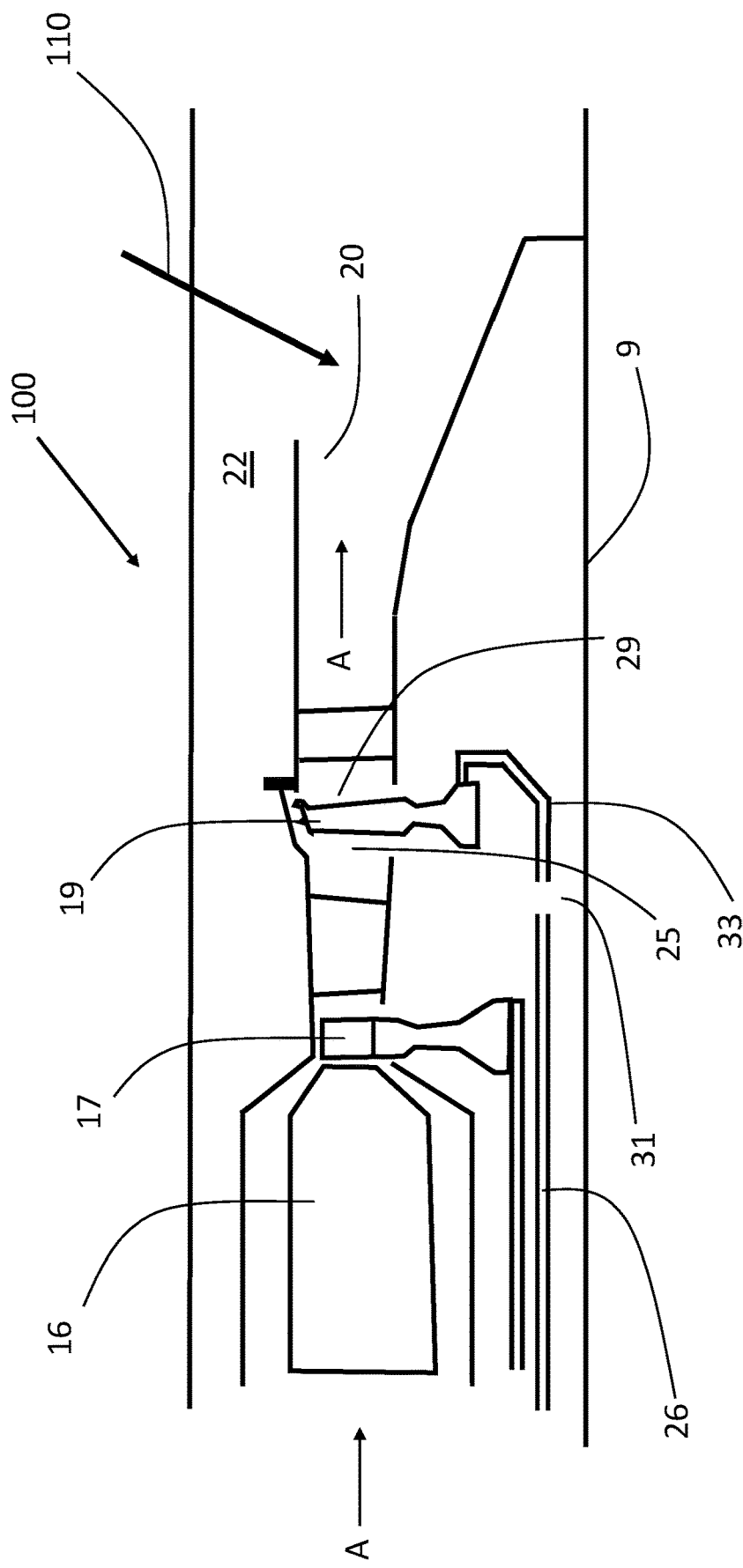
FIG. 4 shows an apparatus for providing turbine overspeed protection known previously.

FIG. 4 shows an apparatus 100 for turbine overspeed protection already known. An amount of fluid 110 is added (or the amount of fluid 110 already being added is increased) downstream of the low-pressure turbine 19 (also referred to as the turbine 19) in a region proximate the exhaust nozzle 20 when a shaft break event is detected. As a result of the fluid 110 introduction, the effective cross-sectional area of the exhaust nozzle 20 decreases, causing a backpressure to travel upstream from the exhaust nozzle 20. Therefore, the mass flow rate through the turbine 19 is also reduced. Correspondingly, the energy imparted to the turbine 19 by the core airflow A reduces, causing a reduction in the terminal speed of the turbine 19.

FIGS. 5 to 10 show exemplary apparatuses for reducing a pressure differential across a turbine (19) of a gas turbine engine (10) during a shaft break event in which a shaft (26) of the gas turbine engine (10) breaks.

In contrast to the apparatus 100 of FIG. 4, the following arrangements of the present disclosure shown in FIG. 5-10 employ a different principal by reducing a pressure differential between a region directly upstream of the turbine 19 and a region directly downstream of the turbine 19 in the event of a shaft break. This is achieved by introducing a pressurised fluid directly downstream of the turbine 19 in the downstream region 29, causing the pressure of the downstream region 29 to increase relative to the upstream region 25. As a result of this increase, less energy is imparted to the turbine 19, so its acceleration stops or reduces-avoiding an overspeed condition. The pressurised fluid increases the pressure local to the downstream region 29 by virtue of its addition, and no immediate or additional action such as combustion of the introduced fluid is required to provide the pressure increase. Furthermore, as the pressurised fluid is introduced directly at the downstream region 29, there may be a near-instantaneous pressure increase at the downstream region 29 and therefore a near-instantaneous slowing of the turbine 19.

Whereas, in arrangement of FIG. 4, a notable delay may occur while a backpressure wave travels the significant distance upstream from the exhaust nozzle 20 to cause a pressure increase in the downstream region 29.

Figure 5:
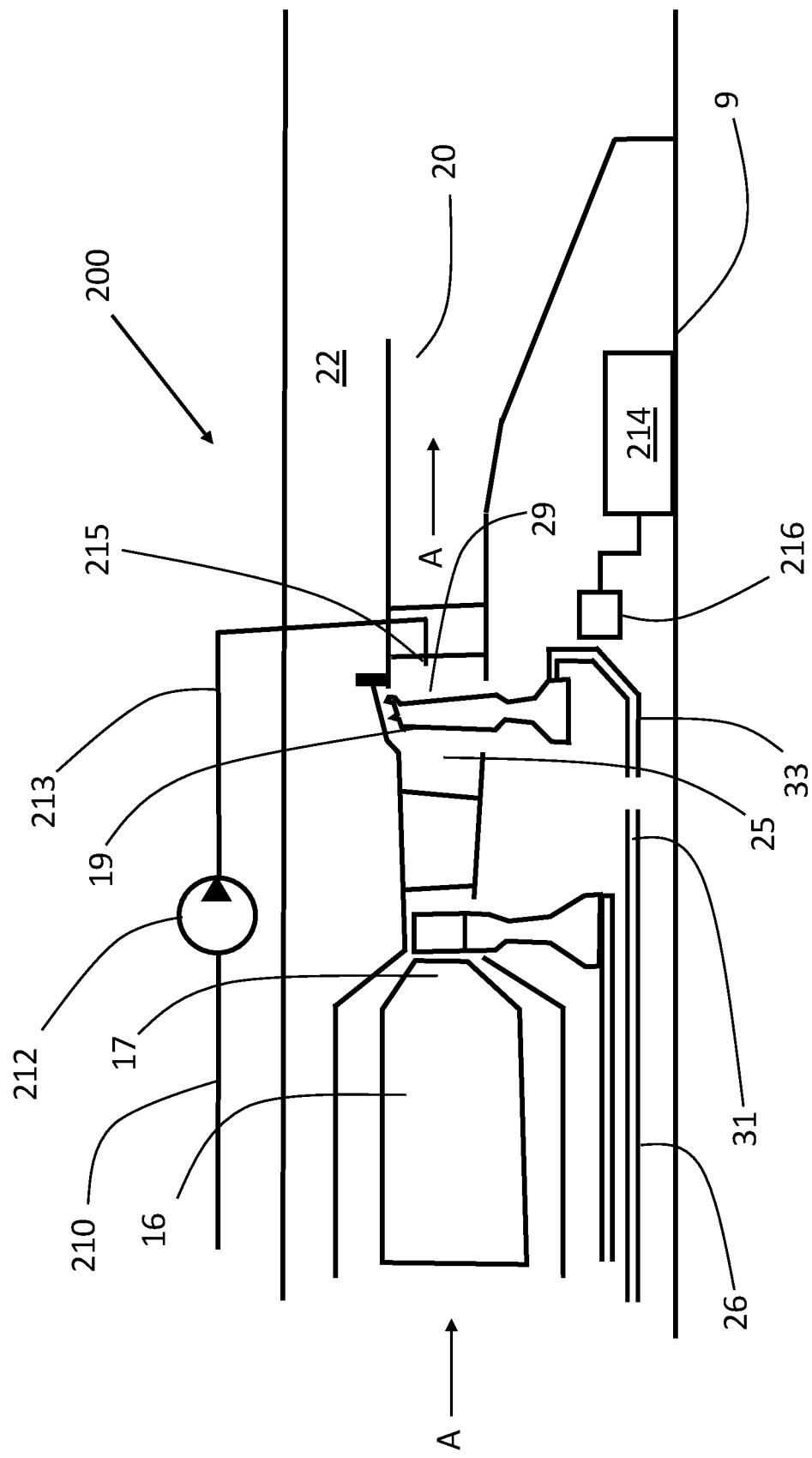
FIG. 5 shows one exemplary arrangement which uses a pump to introduce pressurised fluid.

FIG. 5 shows one possible arrangement of the apparatus 200. In this arrangement, a sensor 216 is configured to detect when a shaft break event occurs. This may be achieved in any number of ways. In one arrangement, the detection of a shaft break is achieved by measuring a difference in rotational speed between the shaft 26 and shaft end 33. Many other methods of shaft break detection are possible and applicable to this disclosure. The sensor 216 is connected to a control system 214 and is configured to transmit a signal to the control system 214 when it detects a shaft break event. In some examples, the control system 214 forms part of a larger system, for instance an engine control unit.

A pressurised fluid supply 210 is provided, which is capable of directing pressurised fluid into the core airflow A at the downstream region 29. A pump 212 acts as a regulating element and is disposed in-line with the pressurised fluid supply 210. Before a shaft break event is detected by the sensor 216, the pump 212 inhibits the flow of pressurised fluid from the supply 210 to the downstream region 29. Once the sensor 216 detects a shaft break event and the control system 214 receives the signal transmitted by the sensor 216, the control system 214 activates the pump 212. On activation, the pump 212 begins to permit the flow of pressurised fluid from the supply 210 into the core airflow A at the downstream region 29. In particular, a fluid line 213 is provided from the pump 212, the line 213 having an outlet 215 at the downstream region 29, so as to introduce the pressurised fluid directly into the downstream region 29.

As the pressurised fluid begins to flow into the downstream region 29, the pressure in the downstream region 29 increases. This leads to a decrease in the pressure differential across the turbine 19, resulting in the acceleration of the turbine 19 reducing.

The sensor 216 and control system 214 of this particular arrangement 200 are electrical in nature, but other arrangements using mechanical or analogue control systems are applicable. For instance, in some arrangements, the control system 214 is a mechanical linkage whereby the pump 212 is actuated by a physical movement of the control system 214 initiated by a shaft break event.

In some examples, a valve is used instead of the pump 212 to function as the regulating element. Many types of valve are applicable.

Figure 6A:
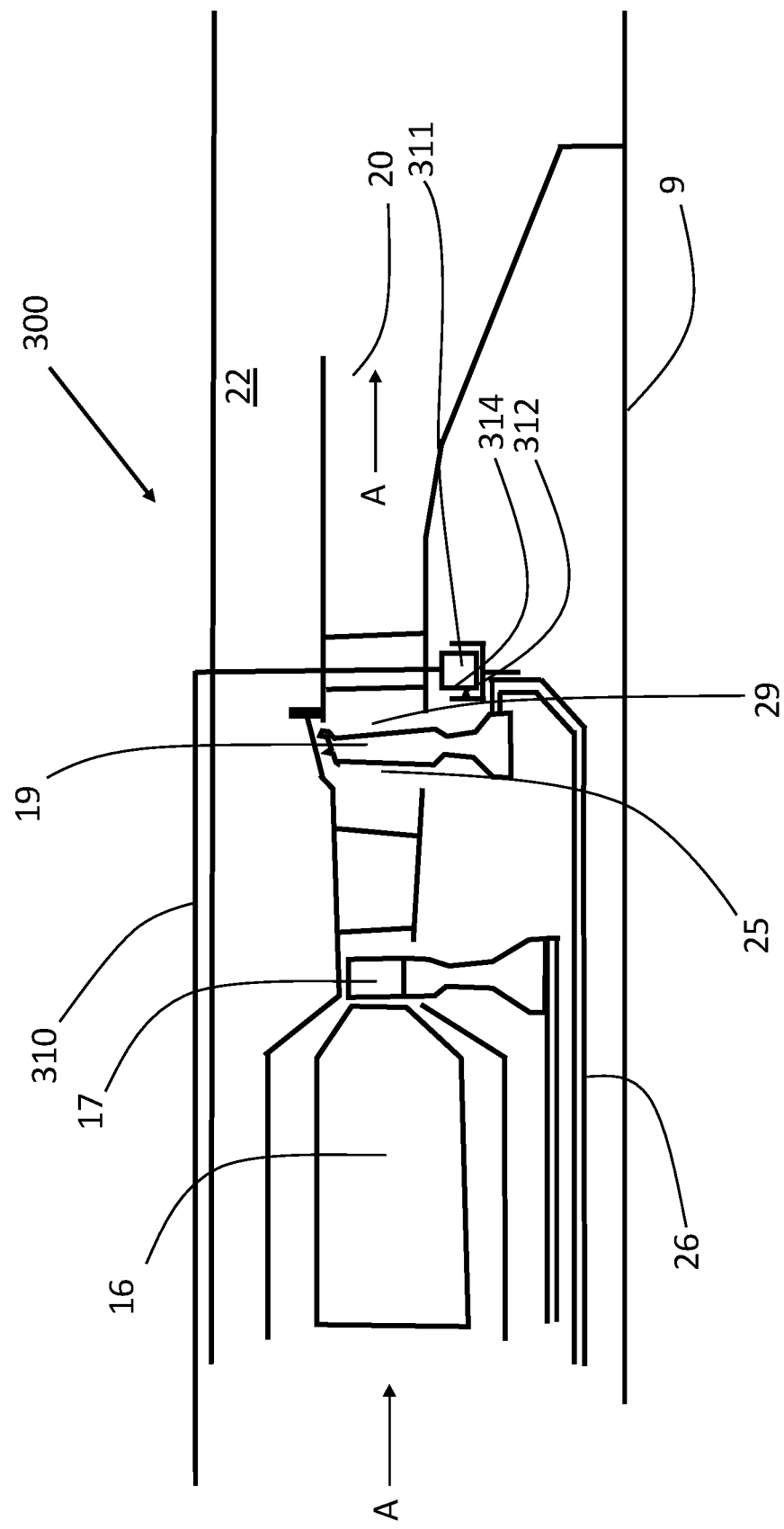
FIGS. 6A and 6B and 7A and 7B show two different exemplary arrangements which use a retaining barrier and piercing element to control the introduction of pressurised fluid.
Figure 6B:
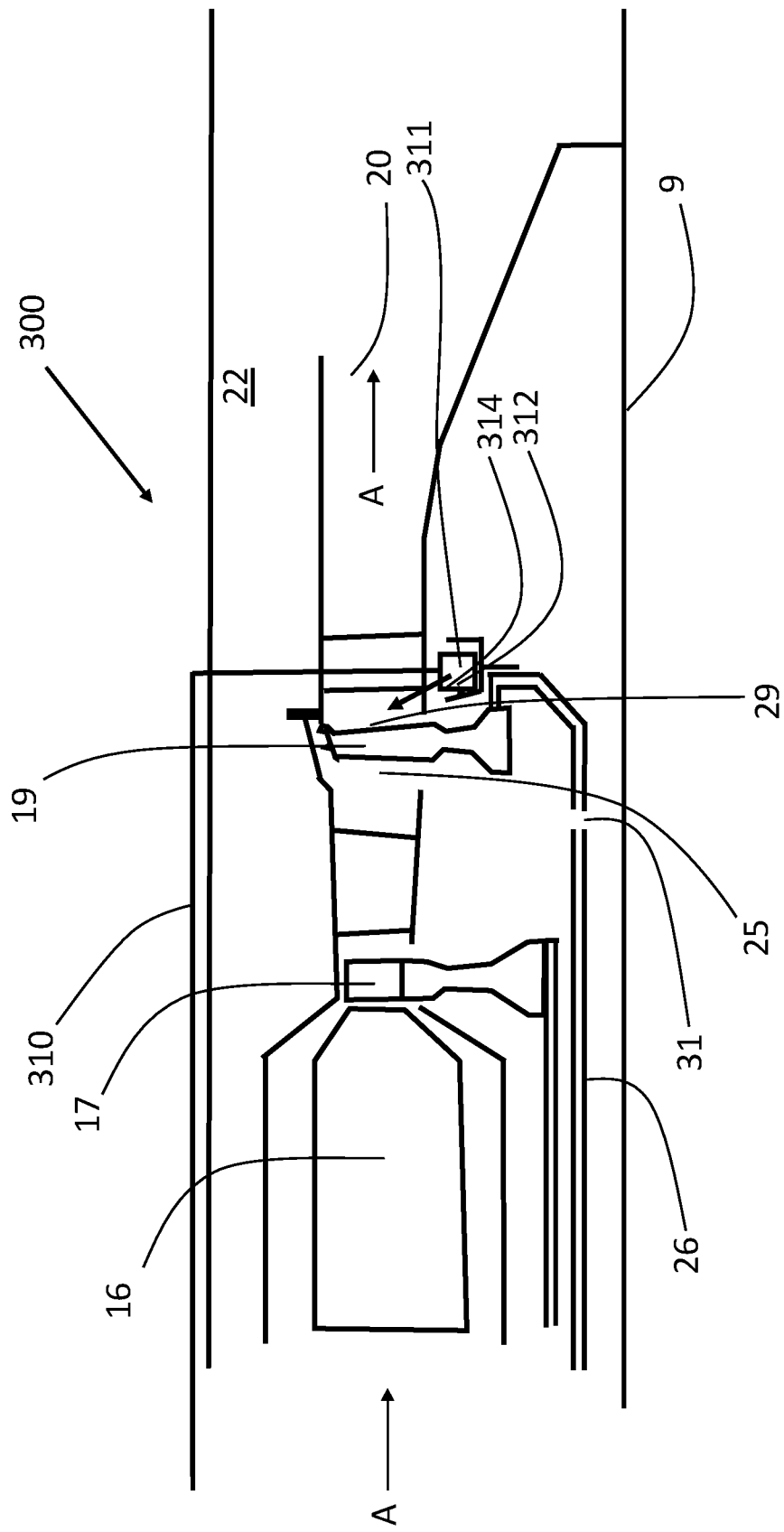
Figure 7A:
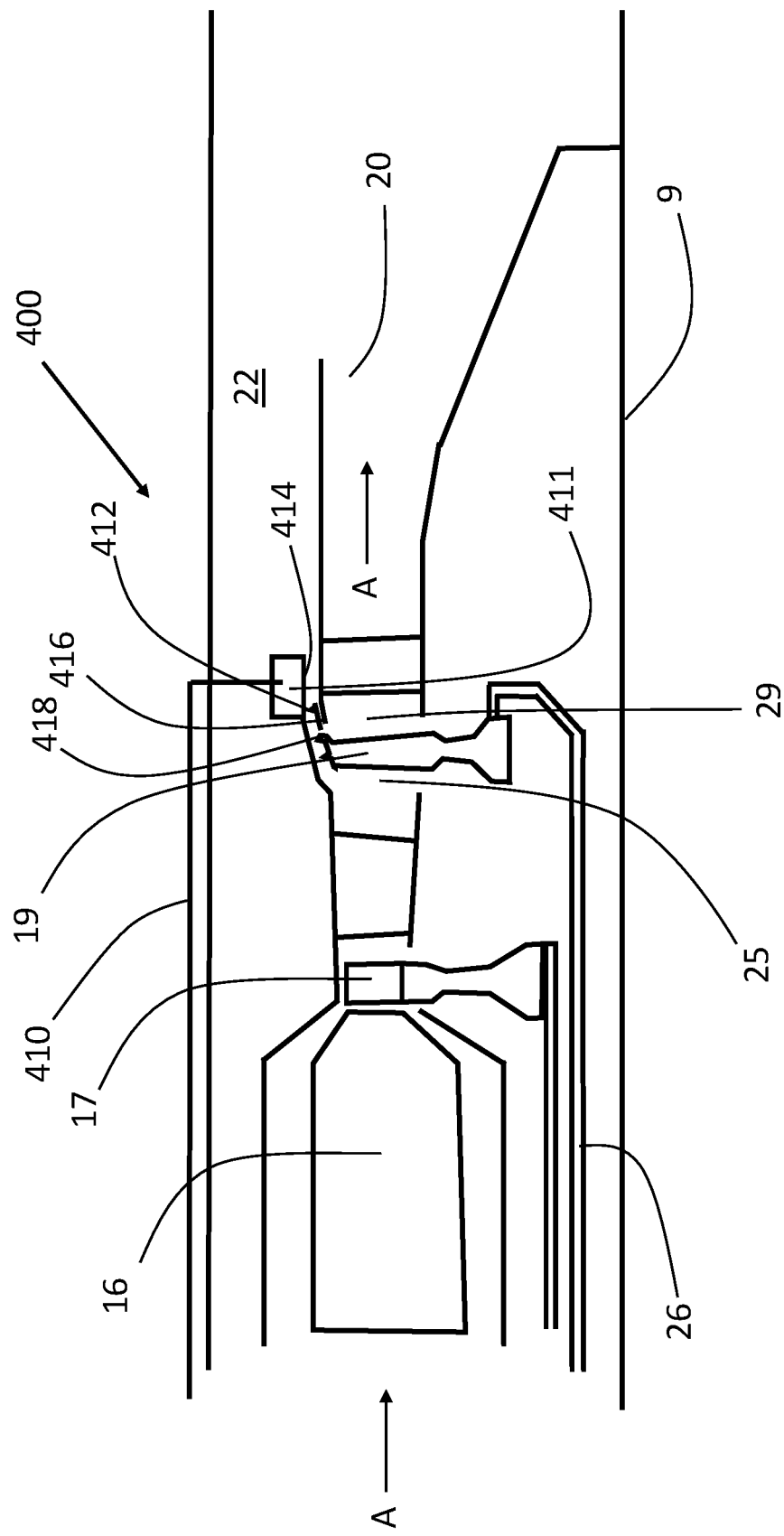
Figure 7B:
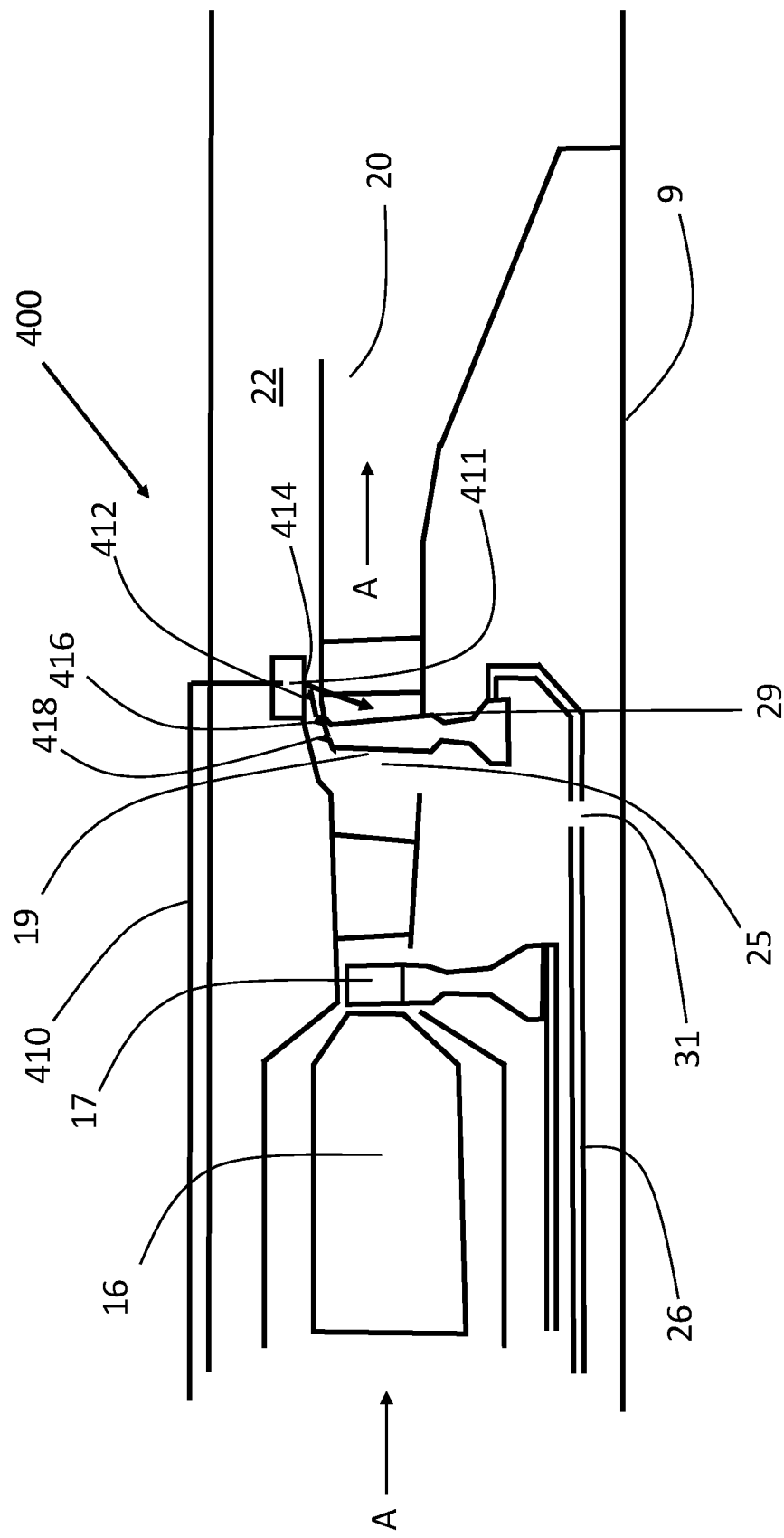

Turning now to FIGS. 6A, 6B, 7A and 7B, two more related arrangements are shown. FIGS. 6A and 6B show one arrangement 300 and FIGS. 7A and 7B show another arrangement 400. FIGS. 6A and 7A show states of the arrangements corresponding to before a shaft break event has occurred, and FIGS. 6B and 7B show states of the arrangements corresponding to after a shaft break event has occurred.

The arrangement 300 shown in FIGS. 6A and 6B has a pressurised fluid supply 310 which directs pressurised fluid towards the downstream region 29. Before a shaft break event, a retaining barrier 314 seals the supply 310, inhibiting pressurised fluid from flowing out from the supply 310 and into the downstream region 29. The retaining barrier 314 may form a wall of a reservoir volume 311 of pressurised fluid may be provided adjacent the downstream region 29. Once a shaft break event occurs, as shown in FIG. 6B, the shaft end 33 and turbine 19 are pushed rearward, downstream, by the pressure differential across the turbine 19. During this rearward movement, the turbine 19 and/or shaft end 33 collides with a piercing element 312. The piercing element 312 is disposed between the turbine 19 and/or shaft end 33 and once contacted by the turbine 19 and/or shaft end 33, also begins to move rearward.

References to "rearward" relate to a direction generally parallel to the axis 9 from the low-pressure and high-pressure compressor 14, 15 end of the engine 10 towards the high-pressure and low-pressure turbine 17, 19 end of the engine 10.

As the piercing element 312 moves rearward it contacts the retaining barrier 314. The retaining barrier 314 is made from a material and with a geometry conducive to being pierced. On contact, the piercing element 312 punctures the retaining barrier 314 causing a hole to form in the retaining barrier 314. At this point, the seal inhibiting the flow of pressurised fluid from the supply 310 (and, if present, the reservoir volume 311) into the downstream region 29 is broken. The pressurised fluid is no longer inhibited and so begins to flow past the retaining barrier 314 and into the core airflow A at the downstream region 29.

In the arrangement 300 shown in FIGS. 6A and 6B, the pressurised fluid supply 310 directs the pressurised fluid towards an area radially close to the axis 9 downstream of the turbine 19. Then, after a shaft break event, the pressurised fluid moves radially outwards, away from the axis 9, where it enters the downstream region 29. Alternatively, as is the case in the arrangement 400 shown in FIGS. 7A and 7B, the pressurised fluid supply 410 may direct the pressurised fluid to an area radially distant from the axis 9.

The retaining barrier 414 again inhibits the flow of pressurised fluid from the pressurised fluid supply 410 to the downstream region 29 before a shaft break event. A reservoir volume 411 may be provided. Once a shaft break event has occurred (shown in FIG. 7B), the turbine 19 and shaft end 33 move rearward. In this arrangement, the turbine radially distal end 418 contacts the piercing element 412. As a result, the piercing element 412 also moves rearwards along a guide 416. During this rearward movement, the piercing element 412 contacts the retaining barrier 414, puncturing it. A hole in the retaining barrier 414 is then formed, resulting in the pressurised fluid flowing from the pressurised fluid supply 410 out into the downstream region 29. In this arrangement, as the pressurised fluid supply 410 directs the pressurised fluid to an area radially distant from the axis 9, the pressurised fluid, once released, moves radially inwards towards form the axis 9 to reach the core airflow A at the downstream region 29.

In other related arrangements, the puncturing of the retaining barrier 314, 414 by the piercing element 312, 412, is a tearing or ripping motion. In some arrangements, the piercing element is fixed or pivotable at one end, so as to permit movement of the other end when contacted by the turbine 19. The free end then punctures the retaining barrier.

Figure 8:
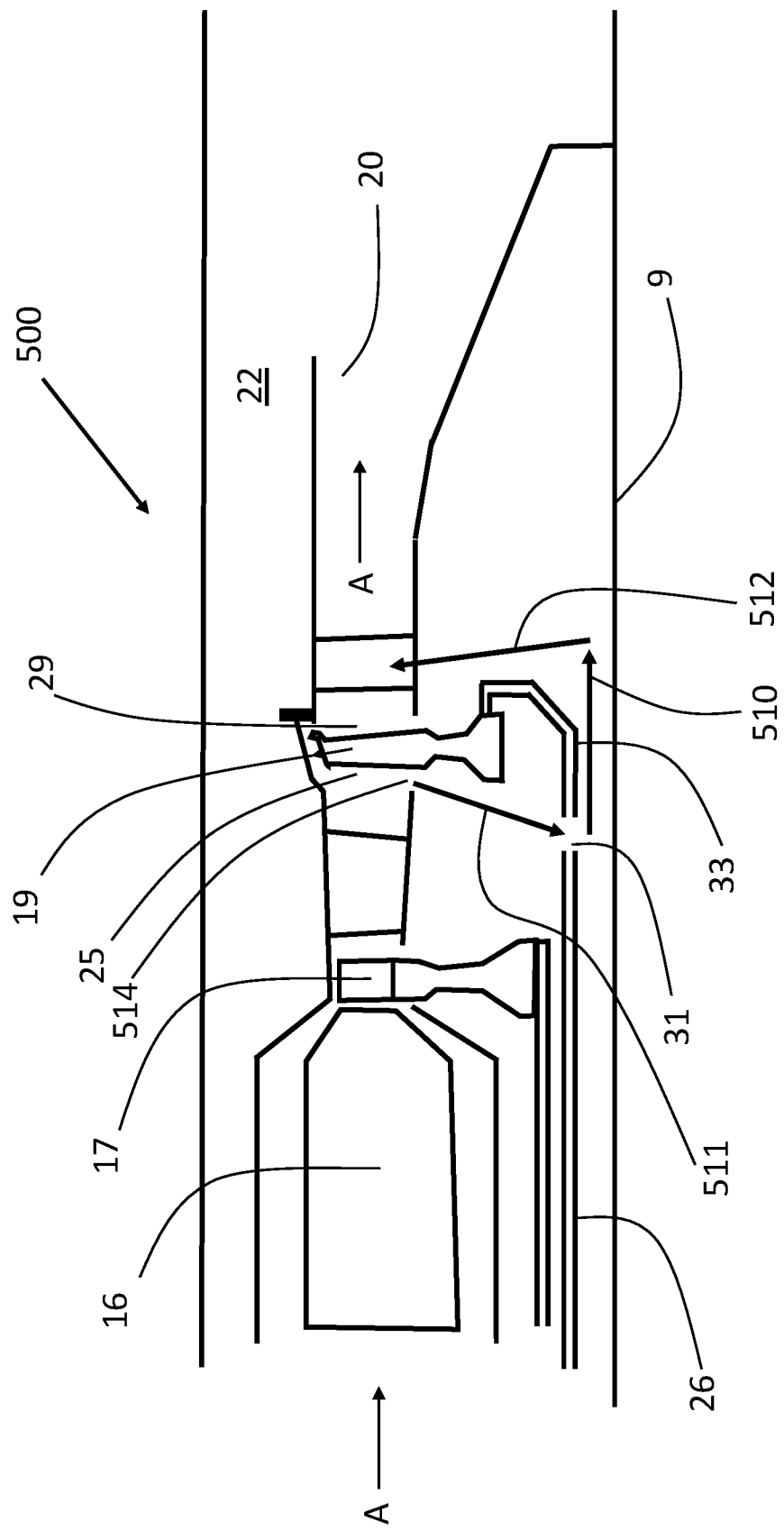
FIG. 8 shows an exemplary arrangement which introduces pressurised fluid via a passage formed during the shaft break event.

FIG. 8 shows a further arrangement 500. In this arrangement, once a shaft break event has occurred, a passage forms between the upstream region 25 and the downstream region 29. The passage provides a route for pressurised fluid to flow from the upstream region 25 to the downstream region 29. A central channel 510 of the passage is formed from a hollow bore of the shaft end 33. The pressurised fluid flows out of the upstream region 25 from an opening 514, directly upstream of the turbine 19. The pressurised fluid then flows radially inwards towards the axis 9 via the inlet channel 511 where it enters the hollow bore of the shaft end 33 via an opening at the break point 31, formed as a result of the shaft break event. The pressurised fluid then flows rearward along the hollow bore of the shaft end 33 (the through central channel 510). Once it reaches the end, it flows radially outwards, away from the axis 9, and into the core airflow A of the downstream region 29 via an outlet channel 512.

Before a shaft break event has occurred, the shaft 26 comprises a continuous wall, meaning the flow of pressurised fluid is inhibited from entering the hollow bore of the shaft end 33. Pressurised fluid is only permitted to enter after the break point 31 has formed once a shaft break event occurs. Once formed, the break point 31 provides an opening into the hollow bore of the shaft end 33.

Figure 9A:
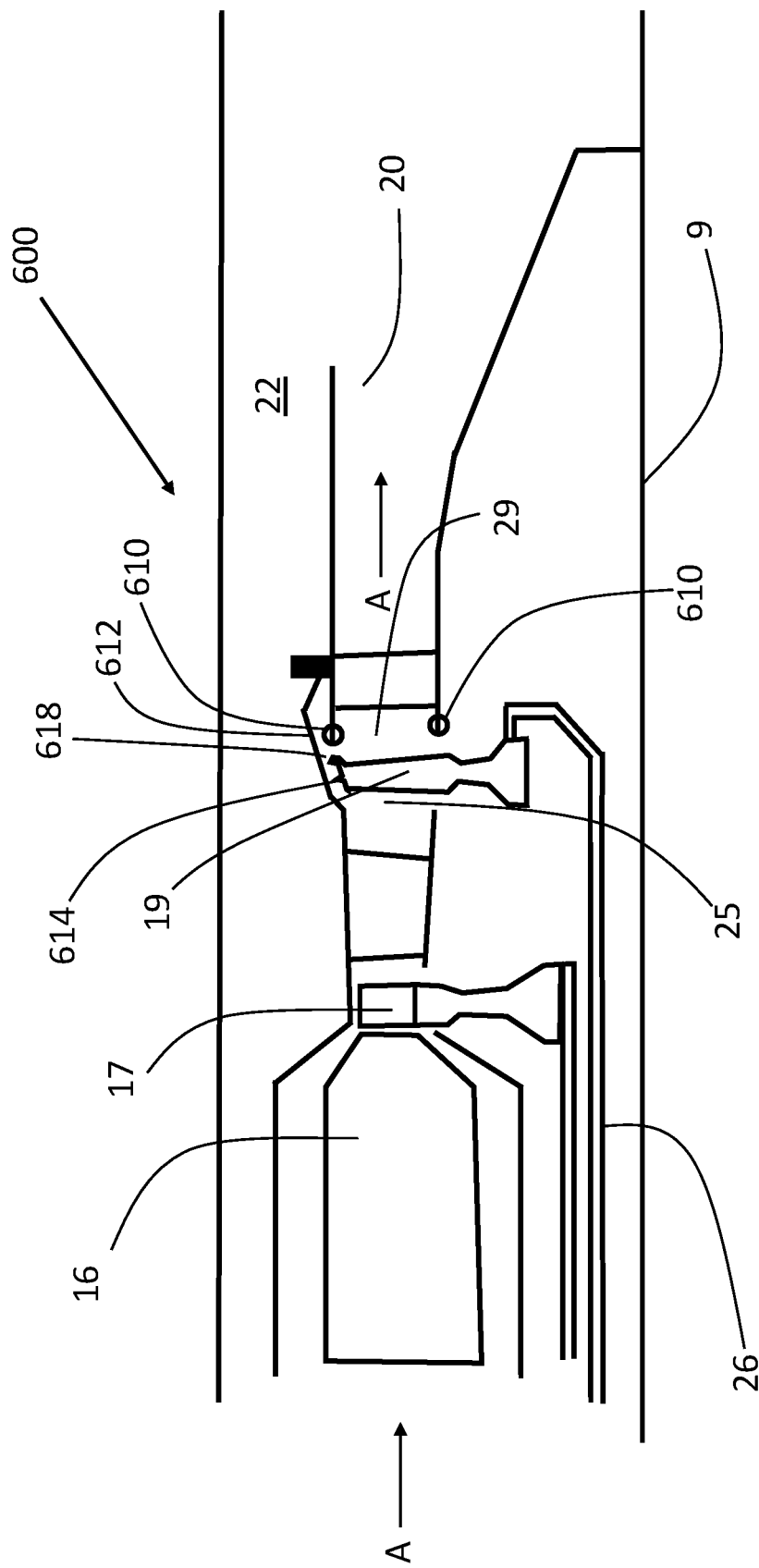
FIGS. 9A and 9B show an exemplary arrangement which uses fuses to control the introduction of pressurised fluid.
Figure 9B:
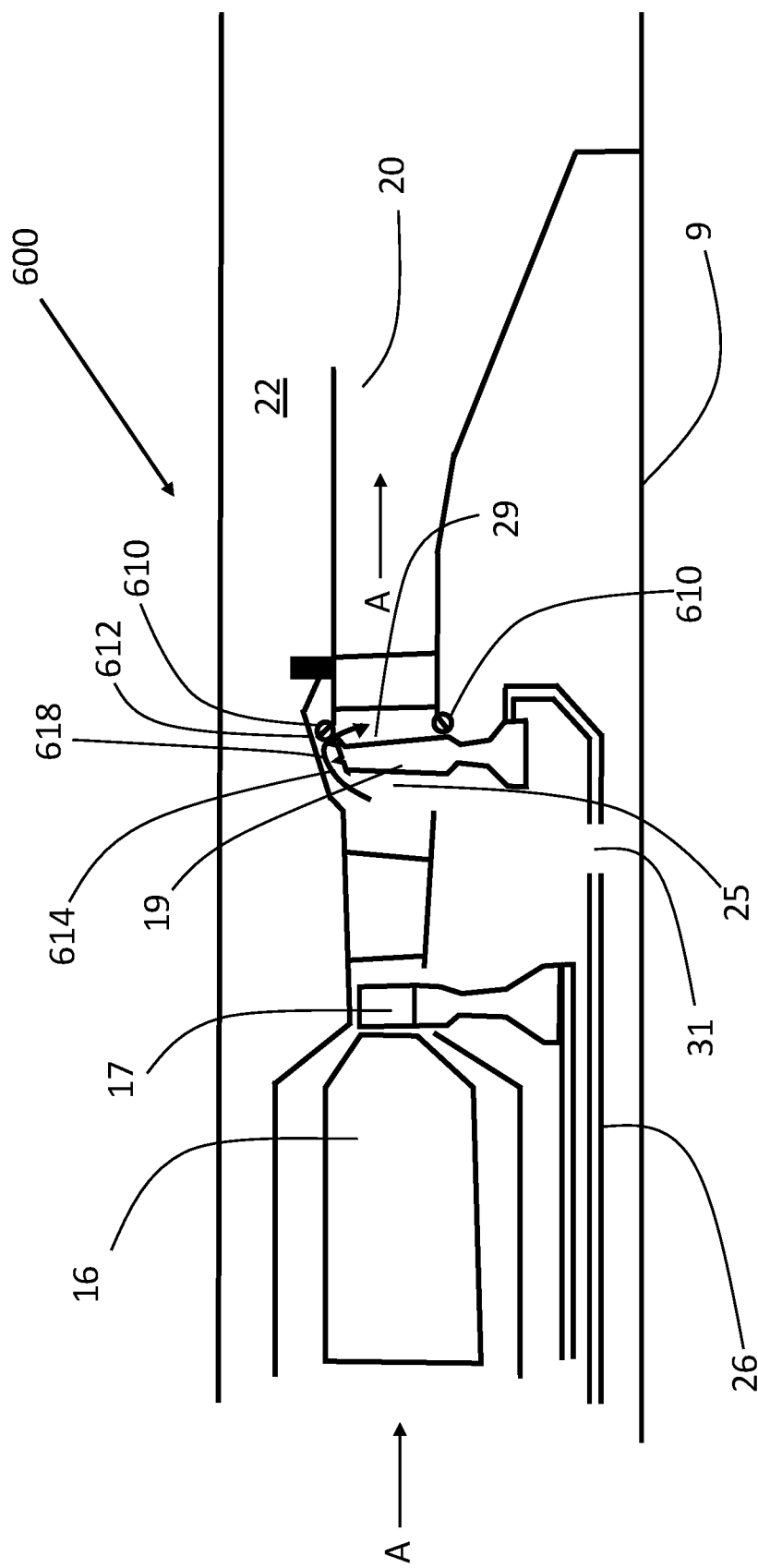

FIGS. 9A and 9B show a further arrangement 600. FIG. 9A shows the arrangement 600 in a state before a shaft break event has occurred and FIG. 9B shows the arrangement 600 in a state after a shaft break event.

Before a shaft break event, due to the shape of the turbine radially distal end 618 and the sloping shape of the opposing wall 612, only a small annular passage 614 between the distal end 618 and the opposing wall 612 exists (shown in FIG. 9A). This passage 614 geometry is sufficient for free rotation of the turbine 19 but does not permit substantial pressurised fluid flow around the outside of the turbine 19 from the upstream region 25 to the downstream region 29. Positioned downstream of the turbine 19, are fuses 610. These further inhibit pressurised fluid from flowing around the turbine 19 from the upstream region 25 into the downstream region 29 during normal operation.

When a shaft break event occurs (as shown in FIG. 9B), the shaft end 33 and turbine 19 move rearward. Due to the sloped shape of the opposing wall 612, as the turbine 19 moves rearward, the passage 614 between the distal end 618 and the opposing wall 612 becomes wider. As the turbine 19 moves further rearward, it contacts the fuses 610. Once contacted, the fuses 610 blow. The combined result of the widening of the passage 614 and the fuses 610 blowing is that the pressurised fluid from the upstream region 25 may flow around the turbine 19. The pressurised fluid of the upstream region 25 flows around the outside of the turbine 19 and into the core airflow A at the downstream region 29, via the newly formed passage 614, causing a reduction in the pressure gradient across the turbine 19 and a reduction in the turbine 19 acceleration.

Figure 10:
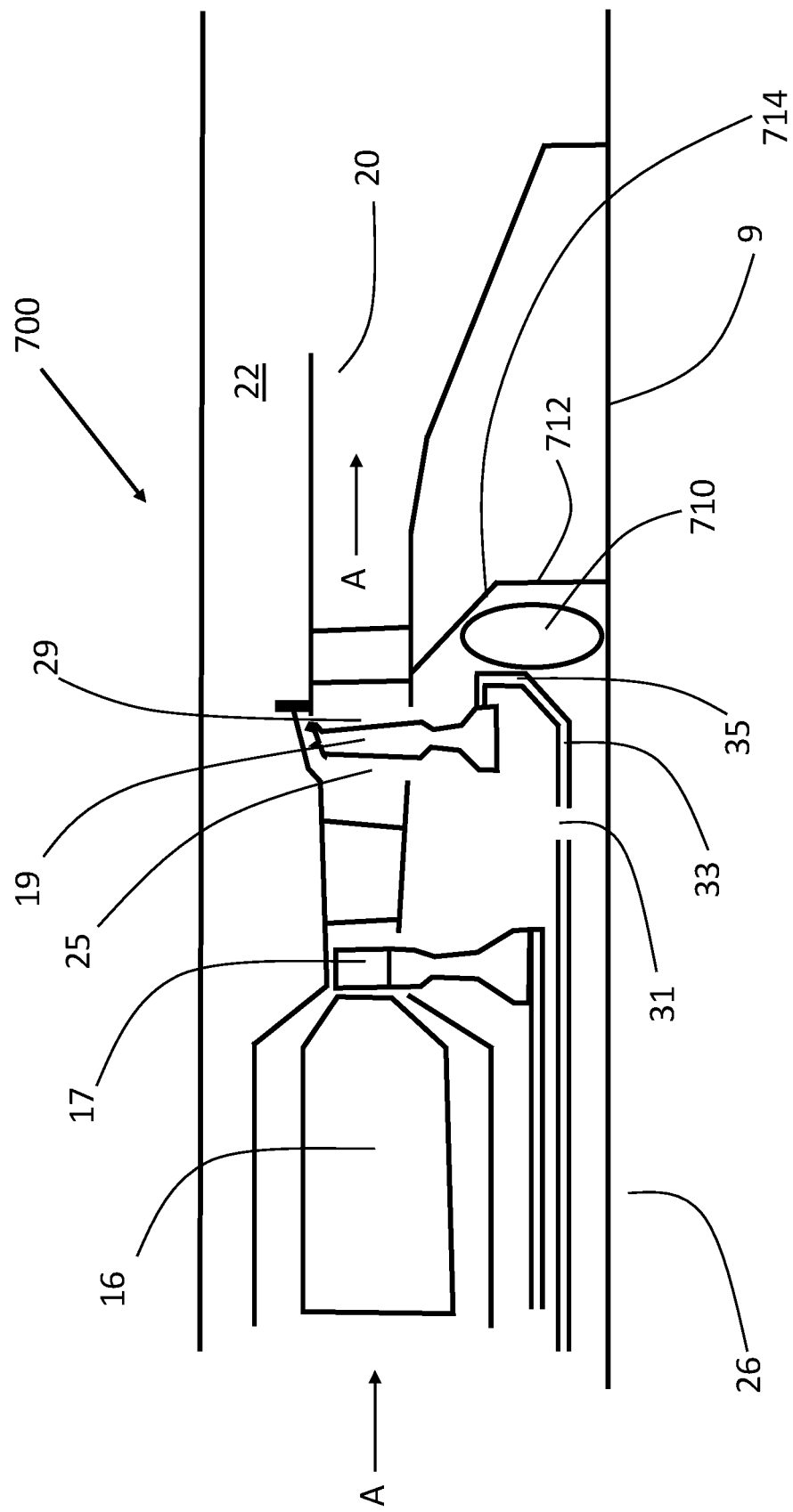
FIG. 10 shows an exemplary arrangement which introduces the pressurised fluid from a compressible fluid reservoir.

FIG. 10 shows an additional arrangement 700. In this arrangement, a compressible fluid reservoir 710 is disposed downstream of the turbine 19 inside a central section of the gas turbine engine 10. The compressible fluid reservoir 710 contains a volume of fluid which is in communication with the downstream region 29 via a channel 714. After a shaft break event, as the turbine 19 and shaft end 33 move rearward, a flange 35 of the shaft end 33 compresses the compressible fluid reservoir 710 against a fixed wall 712 causing the fluid contained within to increase in pressure. As the rearward movement continues, a portion of the now pressurised fluid is ejected from the compressible fluid reservoir 710 via the channel 714 into the core airflow A at the downstream region 29.

Once introduced, the pressurised fluid acts in the same way as in the other embodiments 200, 300, 400, 500, 600, by causing a reduction in the pressure gradient across the turbine 19 and a reduction in the turbine 19 acceleration.

In some arrangements, the force imparted to the compressible fluid reservoir 710 by the moving flange 35 may result in a deceleration of the rearward movement of the turbine 19 and shaft end 33.

In some arrangements, the fluid in the compressible reservoir is ambient air. In others, the fluid is a gas or liquid stored in the compressible fluid reservoir 710 until such time as a shaft break event occurs. A burst valve or similar may be provided between the compressible fluid reservoir 710 and the downstream region 29, so as to permit a predetermined pressure to build up in the compressible fluid reservoir 710 before the fluid is ejected into the downstream region 29.

In all of the arrangements shown in FIGS. 5-10, the pressurised fluid is introduced directly in or at the downstream region 29. The downstream region 29 is the area of the engine core 11 starting proximate to the trailing edges of the turbine 19, extending downstream to and including any directly subsequent stator, guide vanes, or exhaust duct downstream of the turbine. The pressurised fluid may, therefore, be introduced directly at the trailing edges of the turbine blades, upstream of any directly subsequent stator, guide vanes, or exhaust duct downstream of the turbine, or axially in-line with any directly subsequent stator or guide vanes downstream of the turbine.

The arrangements shown in FIG. 6A to FIG. 10 may be triggered automatically when a shaft break event occurs. These so-called passive arrangements do not necessarily require a complex control system to monitor for a shaft break event and coordinate the activation of their respective apparatus 300, 400, 500, 600, 700. The activation of the passive arrangements 300, 400, 500, 600, 700 may occur automatically due to movement of the turbine 19 and/or shaft end 33 resulting from a shaft break event.

Figure 11:
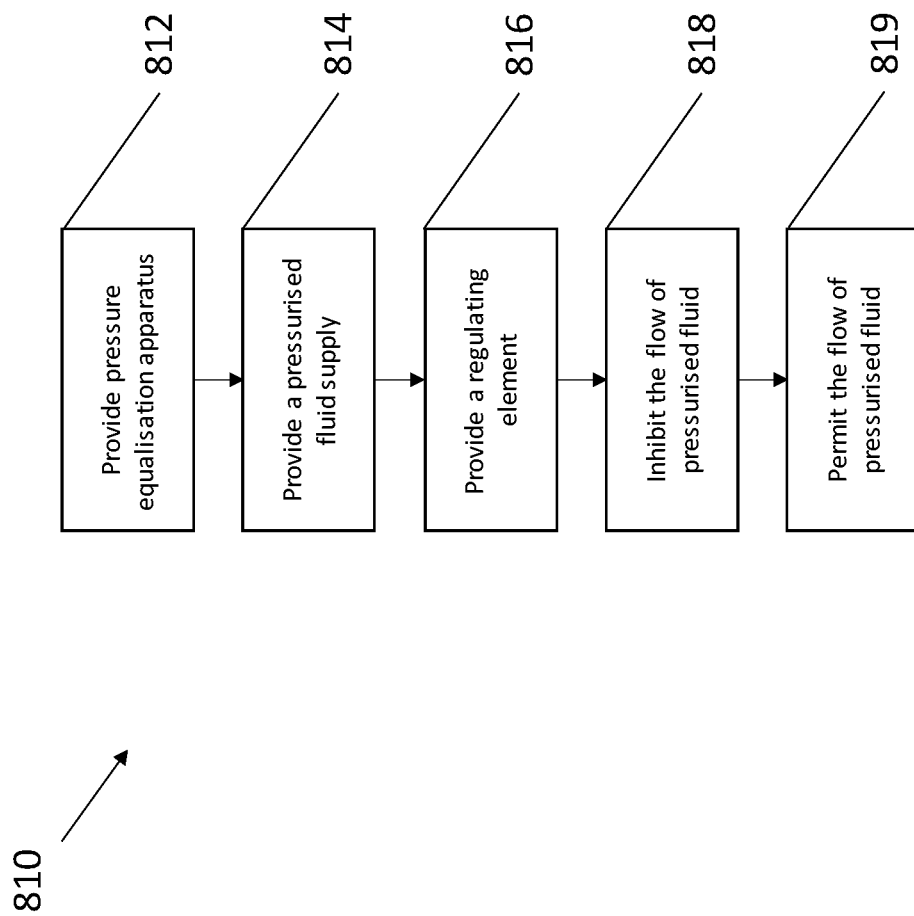
FIG. 11 shows one exemplary arrangement of the method which uses a regulating element to control the flow of pressurised fluid.
Figure 12:
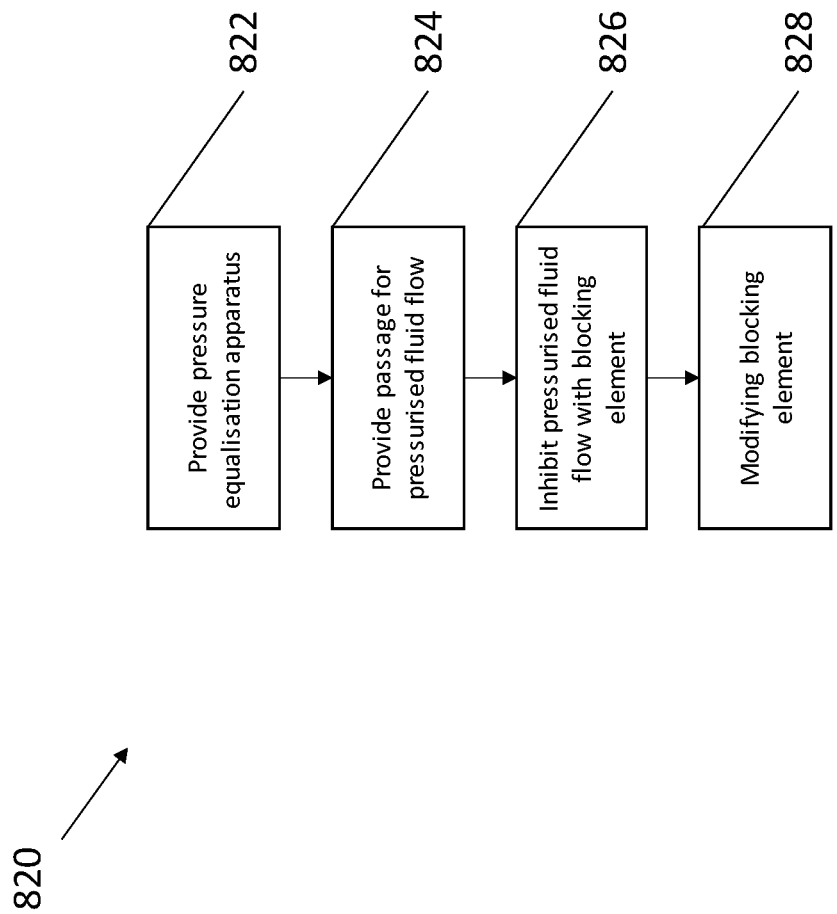
FIG. 12 shows another exemplary arrangement of the method where a blocking element is modified to control pressurised fluid flow.
Figure 13:
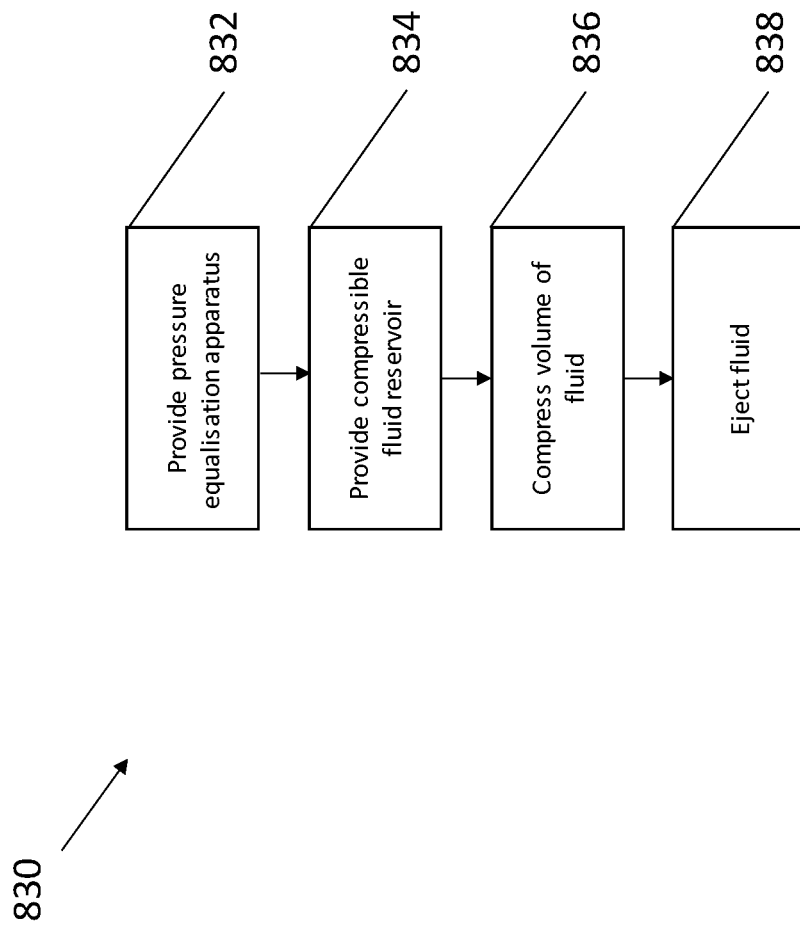
FIG. 13 shows another exemplary arrangement of the method which involves compressing and ejecting a volume of fluid.

FIGS. 11 to 13 show methods according to the present disclosure. With reference to FIG. 11, a method 810 which uses a regulating element to control the flow of pressurised fluid is shown. The method 810 first involves step 812 providing a pressure equalisation apparatus. The pressure equalisation apparatus is capable of introducing a pressurised fluid into the downstream region 29 in the event of a shaft break in order to directly increase the pressure in the downstream region 29.

A pressurised fluid supply is then provided in step 814. This pressurised fluid supply is in communication with the core airflow A at the downstream region 29. In step 816 a regulating element is provided. The regulating element is capable of controlling the introduction of pressurised fluid from the pressurised fluid supply into the downstream region 29.

Step 818 represents the standard state of the system before a shaft break event occurs. In this state, the regulating element inhibits the flow of pressurised fluid from the supply into the downstream region 29. Once a shaft break event occurs, the method continues on to step 819 where the regulating element beings to permit the flow of pressurised fluid into the core airflow A at the downstream region 29.

In some examples, the regulating element is a pump 212 which is actuated by a control system 214. The control system 214 receives a signal from a shaft break detection sensor 216 in the event of a shaft break, at which point the control system 214 actuates the pump 212. In other examples, the regulating element is a retaining barrier 314, 414 and piercing element 312 412 assembly. The retaining barrier 314, 414 seals off the pressurised fluid supply 310, 410 until a shaft break event occurs. When a shaft break event does occur, the piercing element 312, 412 pierces the retaining barrier 314, 414, thus allowing the pressurised fluid to flow from the supply 310, 410 into the core airflow A at the downstream region 29. Apparatuses 200, 300, 400 may each employ the method 810.

FIG. 12 shows an alternative arrangement 820 of the method presently disclosed. Method 820 begins at step 822 by providing the same pressure equalisation apparatus as provided in step 812 of method 810. A passage for pressurised fluid flow is then provided at step 824. The passage provides fluid communication between the upstream region 25 and the downstream region 29.

Next, in step 826, the flow of pressurised fluid is inhibited by a blocking element. The blocking element inhibits the flow of pressurised fluid from the upstream region 25 to the downstream region 29 via the passage. Before a shaft break event, the method 820 does not proceed beyond this step 826 and the pressurised fluid flow remains inhibited. Once a shaft break event occurs, the method 820 proceeds to step 828 where the blocking element is modified in order to permit the flow of pressurised fluid via the passage from the upstream region 25 to the downstream region 29.

In some examples, the blocking element is a fuse 610 disposed downstream of the turbine 19. Before a shaft break event, the fuse 610 blocks pressurised fluid from passing from the upstream region 25 to the downstream region 29 by flowing around the turbine 19. Then, once a shaft break event occurs, the rearward movement of the turbine 19 and shaft end 33 causes the turbine 19 and/or shaft end 33 to contact the fuse 610. On contact, the fuse 610 blows, widening the passage for pressurised fluid to flow from the upstream region 25 to the downstream region 29 around the turbine 19. In this case, the step 828 of modifying the blocking element is the fuses blowing.

In other examples, the blocking element is the shaft 26 before a shaft break event. Once a shaft break event occurs, the shaft 26 and shaft end 33 separate at a break point 31. The break point 31 provides a route for pressurised fluid to enter the hollow bore of the shaft end 33 which, before a shaft break event, would not have been possible. In this case, the step 828 of modifying the blocking element is the break point 31 forming and the shaft end 33 separating. Apparatuses 500 and 600 may each employ the method 820.

Turning finally to FIG. 13, a further arrangement 830 of the method is shown. Again, this arrangement 830 begins at step 832 by providing a pressure equalisation apparatus, as is the case in arrangements 810 and 820. The method then proceeds to step 834 where a compressible fluid reservoir 710 containing a volume of fluid is provided. The compressible fluid reservoir 710 is provided downstream of the turbine 19 and is in communication with the downstream region 29 via a channel 714. The method 830 does not proceed further until a shaft break event occurs.

Once a shaft break event occurs, the method 830 moves to step 836 where the volume of fluid contained within the compressible fluid reservoir 710 is compressed against a fixed wall 712. The compression is caused by a rearward movement of the turbine 19 and/or shaft end 33 pushing the compressible fluid reservoir 710 against the fixed wall 712. During the compression, the volume of fluid increases in pressure. The method then moves to step 838 where at least a portion of the now pressurised fluid is ejected out of the compressible fluid reservoir 710 and into the core airflow A at the downstream region 29 via the channel 714. Apparatus 700 may employ the method of 830.

Although the arrangements disclosed relate to the low-pressure turbine 19, other arrangements related to other turbines (e.g., the high-pressure turbine 17) using the same apparatus or methods as defined by the appended claims are also applicable. Any other arrangements for reducing a pressure differential across a turbine by introducing a pressurised fluid into a core airflow directly downstream of the turbine in the event of a shaft break are also covered by the present disclosure.

It will be understood that the disclosure is not limited to the arrangements above described and various modifications and improvements can be made without departing from the scope of the claims. Except where mutually exclusive, any of the features may be employed separately or in combination with any other features and the disclosure extends to and includes all combinations and sub-combinations of one or more features described herein.

What is claimed is:

1. An apparatus for reducing a pressure differential across a turbine of a gas turbine engine during a shaft break event in which a shaft of the gas turbine engine breaks, the apparatus comprising:
   a pressure equalization apparatus configured to introduce a pressurised fluid into a core airflow (A) at a region proximate to trailing edges of turbine blades and upstream of subsequent stator, guide vanes, or exhaust duct downstream of the turbine in the shaft break event to directly increase a local pressure at the region proximate to the trailing edges of the turbine blades and upstream of the subsequent stator, the guide vanes, or the exhaust duct downstream of the turbine and thereby reduce the pressure differential across the turbine;
   a pressurised fluid supply in communication with the core airflow (A) at the region; and
   a regulating element configured to regulate the introduction of the pressurised fluid from the pressurised fluid supply into the core airflow (A) at the region;
   wherein the regulating element is configured to inhibit a flow of the pressurised fluid from the pressurised fluid supply into the core airflow (A) at the region before the shaft break event occurs and configured to permit the flow of pressurised fluid from the pressurised fluid supply into the core airflow (A) at the region once the shaft break event occurs;
   wherein the regulating element comprises:
   a retaining barrier configured to inhibit the flow of pressurised fluid from the pressurised fluid supply into the core airflow (A) at the region; and
   a piercing element operatively connected to or engageable by the turbine or the shaft and configured to puncture the retaining barrier during rearward movement of the turbine or the shaft in the shaft break event, so as to permit the flow of pressurised fluid into the core airflow (A) at the region.

2. A gas turbine engine comprising an apparatus as claimed in claim 1.

3. A method for reducing a pressure differential across a turbine of a gas turbine engine during a shaft break event in which a shaft of the gas turbine engine breaks, comprising:
   providing a pressure equalization apparatus configured to introduce a pressurised fluid into a core airflow (A) at a region proximate to trailing edges of turbine blades and upstream of subsequent stator, guide vanes, or exhaust duct downstream of the turbine in the shaft break event to directly increase a local pressure at the region proximate to the trailing edges of the turbine blades and upstream of the subsequent stator, the guide vanes, or the exhaust duct downstream of the turbine and thereby reduce the pressure differential across the turbine;
   providing a pressurised fluid supply in communication with the core airflow (A) at the region; and
   providing a regulating element configured to regulate the introduction of the pressurised fluid from the pressurised fluid supply into the core airflow (A) at the region;
   inhibiting, using the regulating element, a flow of the pressurised fluid from the pressurised fluid supply into the core airflow (A) at the region before the shaft break event occurs; and
   permitting, using the regulating element, the flow of pressurised fluid from the pressurised fluid supply into the core airflow (A) at the region once the shaft break event occurs;
   wherein the regulating element comprises:
   a retaining barrier for inhibiting the flow of pressurised fluid from the pressurised fluid supply into the core airflow (A) at the region; and
   a piercing element operatively connected to or engageable by the turbine or the shaft and configured to puncture the retaining barrier during rearward movement of the turbine or the shaft in the shaft break event for permitting the flow of pressurised fluid into the core airflow (A) at the region.

* * * * *